United States Patent [19]

Waldo et al.

[11] Patent Number: 4,487,228

[45] Date of Patent: Dec. 11, 1984

[54] WEATHER-RESISTANT AND SELF-DRAINING THREAD PROTECTOR

[75] Inventors: David T. Waldo, Kingwood, Tex.; James L. Peterson, Gretna; William D. Grimes, Harvey, both of La.

[73] Assignees: Shell Oil Company; Shell Offshore Inc., both of Houston, Tex.

[21] Appl. No.: 562,548

[22] Filed: Dec. 19, 1983

[51] Int. Cl.³ .......................................... F16L 55/10
[52] U.S. Cl. ..................................... 138/96 T; 138/89
[58] Field of Search ................ 138/89, 96 R, 96 T; 220/237

[56] References Cited

U.S. PATENT DOCUMENTS

| | | | |
|---|---|---|---|
| 1,653,403 | 12/1927 | McCue | 138/96 R |
| 1,708,657 | 4/1929 | Brown et al. | 138/96 T |
| 2,737,205 | 3/1956 | Stringfield | 138/96 R X |
| 2,780,718 | 2/1957 | Mullen | 138/96 R X |
| 3,074,579 | 1/1963 | Miller | 138/96 T |
| 3,661,291 | 5/1972 | Hetzer | 138/96 T X |
| 3,818,946 | 6/1974 | Bonnes et al. | 138/96 R |
| 4,210,179 | 7/1980 | Galer | 138/96 T |
| 4,303,101 | 12/1981 | Tholen | 138/96 R X |
| 4,337,799 | 7/1982 | Hoover | 138/96 T |
| 4,379,471 | 4/1983 | Kuenzel | 138/96 T X |

FOREIGN PATENT DOCUMENTS 2093426  2/1981  United Kingdom ............. 138/96 T

*Primary Examiner*—James E. Bryant, III

[57] ABSTRACT

A self-draining composite plastic and steel thread protector for both the pin and box ends of oil field tubulars. The protector completely seals and prevents pressure differentials across the threads as well as provides openings for draining any moisture that may enter the tubular.

12 Claims, 2 Drawing Figures

WEATHER-RESISTANT AND SELF-DRAINING THREAD PROTECTOR

BACKGROUND OF THE INVENTION

The present invention pertains to pipe thread protectors and particularly to thread protectors which are designed to protect the sealing surfaces of threads on tubular joints used in drilling and producing oil, water and gas wells.

Thread protectors have been traditionally used to protect threads on the ends of tubular goods during shipment and handling. Most protectors are in the form of cup-shaped members which thread over the end of the pipe to protect the threads. In addition, some thread protectors have been designed with completely closed ends to exclude water and foreign material from the interior of the pipe or completely open ends to provide maximum air circulation. Typically, thread protectors have been formed of metal or plastic or a combination of the two materials.

A typical thread protector is shown in U.S. Pat. No. 4,210,179 and comprises a cup-shaped plastic member which fits over the end of the pipe and is secured in position by a steel band. The steel band engages wedge-shaped projections formed on the exterior of the protector to force the protector into firm engagement with the threads of the pipe. In addition, the plastic portion of the protector is provided with a groove for containing an O-ring that seals the threads from moisture or water while the bottom wall of the protector effectively seals the interior of the pipe from moisture or water.

SUMMARY OF THE INVENTION

The present invention provides an improved thread protector which is especially adapted for use with threaded connections having corrosion sensitive metal-to-metal sealing surfaces. These threads have sealing surfaces on both the pin and box ends which contact when the two joints of pipe are assembled. The sealing surfaces function both to prevent leakage of fluids or gas through the threaded joint and the contact between the surfaces allows the torque of the rotary table to be transmitted through the tubular pipe to the rotary bit at the bottom of the well. The improved thread protector comprises a cup-shaped member which is molded from suitable plastic materials and surrounded on one surface by a second cup-shaped member formed of metal such as steel. The combination of the two materials provides a thread protector which will not damage the threads, yet has sufficient mechanical strength to absorb the abuse to which the tubular joint may be subjected during shipment and handling.

The molded plastic member is provided with sealing rings which effectively isolate the threads and the faces of the pipe joint from water, vapor or other materials. In addition, the thread protector is provided with drain holes which allow the interior of the pipe to drain so that no liquid or water vapor will accumulate within the pipe joint. While the drain holes provide a means for draining the interior of the pipe, they are so positioned that rain will not penetrate into the interior of the pipe, thus subjecting the inside of the pipe to corrosion or similar conditions, unlike open-ended thread protectors. The drain holes also prevent air pressure differentials from occurring across the threads during seasonal and day to night temperature cycles; which effect has been observed to pull corrosive, moisture containing air across the corrosion sensitive threads of tubulars equipped with closed-end thread protectors.

BRIEF DESCRIPTION OF THE DRAWINGS

The present invention will be more easily understood from the following detailed description when taken in conjunction with the attached drawings in which.

DESCRIPTION OF THE PREFERRED EMBODIMENTS

Figure 1:
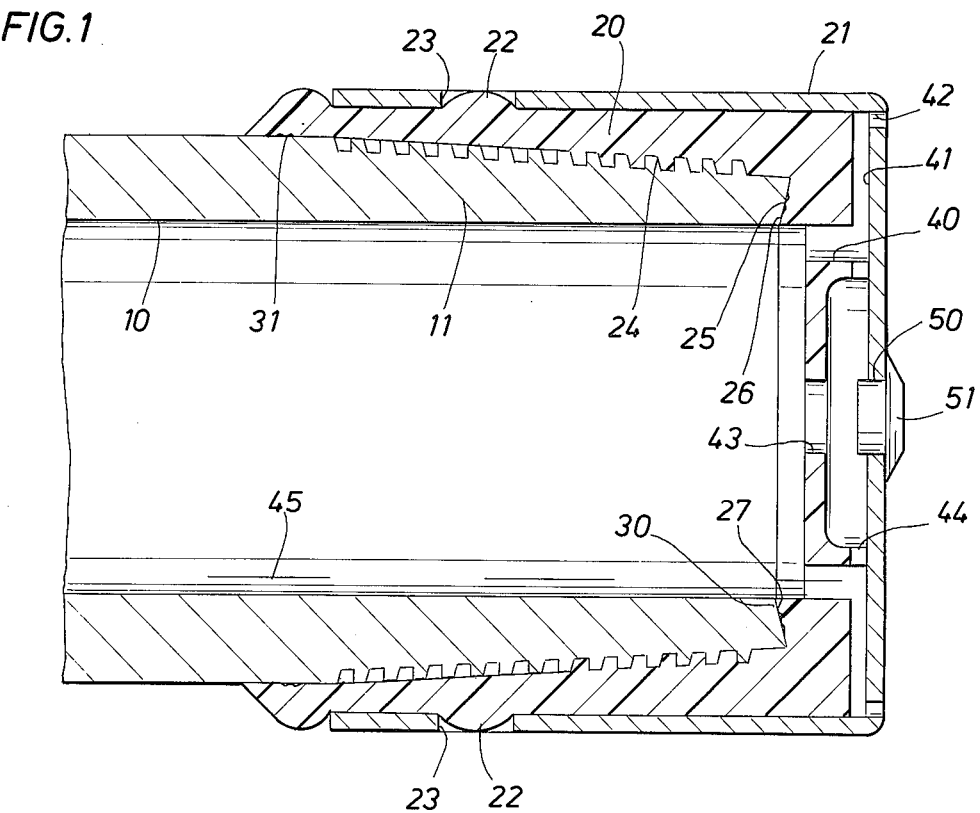
FIG. 1 is a longitudinal section of a pipe protector for use with the pin end of a tubular joint.

Referring to FIG. 1, there is shown a thread protector constructed according to this invention for use with the pin end 11 of a tubular joint 10. The thread protector comprises a first plastic cup-shaped member 20 which is surrounded on its outside by a second cup-shaped member 21 formed of steel or similar metal. The inner plastic cup-shaped member is secured to the outer steel cup-shaped member by a series of bosses 22 which project outwardly into openings 23 formed in the cylindrical wall of the steel member 21. The bosses should project into the steel member a sufficient distance to firmly secure the two members together and allow the plastic member to be threaded onto the pin end of the tubular joint by rotating the steel member 21. The inner cylindrical wall of the plastic member is provided with threads 24 which mate with the threads on the pin member of the joint. The inner plastic member is provided with a bottom wall portion which has a raised annular flanged section 25 adjacent the inner wall of the inner cylindrical wall of the member. The raised portion 25 is shaped so that it corresponds to the seal end 26 of the tubular joint. In addition, the raised portion is provided with a raised angular ring section 30 which with grease effectively seals the seal end 26 of the tubular joint from any fluids or other foreign matter which may be in the interior of the tubular joint. A similar raised annular ring section 31 is formed at the end of the cylindrical wall of the plastic member 20 to form an effective seal between the plastic member and the outer surface of the tubular joint adjacent the ends of the threads.

From the above description it is seen that the plastic member effectively seals the seal surface 26 of the tubular joint as well as the threads from water or other foreign materials.

The plastic member is provided with a series of openings or drain holes 40 around the periphery of the bottom wall. The openings 40 are aligned with the inner diameter of the tubular joint as shown in FIG. 1. Thus, any water of other foreign material in the interior of the tubular joint will flow along the path indicated by the arrows 45 and exit from the tubular joint. Drain holes 40 align with radial passageways 41 formed in the end of the plastic member 20. The passageway 41 is aligned with drain openings 42 formed in the bottom wall of the steel outer member 21. A similar drain hole 43 is provided in the center of the bottom wall of the plastic member while radial passageways 44 allow the bottom of the plastic member to drain into the passageways 41.

A square shaped hole 50 is provided in the bottom wall of the steel outer member to provide a means for threading the protector onto and off of a pin end of a tubular joint. The square opening may be closed by a plastic button 51.

As explained above, the inner cup-shaped member 20 is formed from an easily moldable plastic such as polyethylene or polypropylene. In addition, other types of plastic materials or natural or synthetic rubber type materials that are easily molded may be used. The main requirement for the material is that it be readily moldable, withstand the temperatures to which it may be subjected and provide good sealing contact between the surfaces of the tubular joint and the plastic member. The outer cup-shaped member 21 may be formed of any type of material which will provide a hard surface which can withstand the abuse to which the thread protector is subjected. Since low cost is a desirable feature of any thread protector, the member 21 is preferably formed of thin steel which can be readily drawn into the cup-shaped configuration shown in the drawings.

Figure 2:
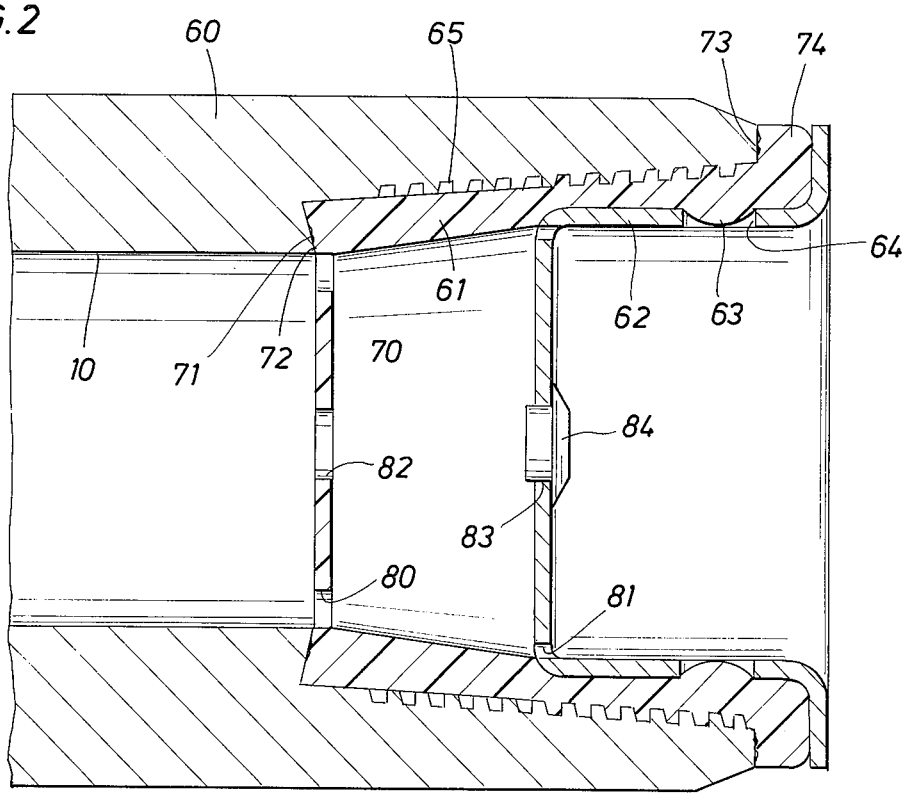
FIG. 2 is a cross section of a thread protector for use with the box end of a tubular joint.

Referring to FIG. 2, there is shown a thread protector constructed according to the present invention for use with the box end of a tubular joint. The thread protector in FIG. 2 includes a cup-shaped plastic member 61 and an inner cup-shaped member 62 formed of suitable metal such as steel. The inner cup-shaped member 62 is retained in the plastic cup-shaped member by a series of projecting bosses 63 formed on the plastic member which engage a series of holes 64 formed in the metal member. The cup-shaped plastic member is provided with a surface 71 at its inner end which conforms to the seal surface of the box end 60 of the tubular joint. The surface 71 is also provided with a raised sealing ring 72 for effectively sealing the seal surface of the box end from the interior of the tubular joint. The bottom wall of the plastic member is provided with a series of drain holes 80 along its outer periphery that align with the inner surface of the tubular joint. Similar drain holes 81 are provided in the bottom wall of the cup-shaped metal member 62 to provide drainage for the interior of the tubular joint. The plastic member is provided with an outwardly projecting radial flange 74 which seals the end of the tubular joint. The seal is effected by a raised seal ring 73 which projects from the bottom of the flange 74 and a coating of grease is applied to the surface of the tubular joint and the plastic member. A square opening 83 is formed in the bottom wall of the metal cup-shaped member and may be closed by a sealing button 84. This square hole provides a means for threading the protector on and off a boxed end of the tubular joint.

The thread protector shown in FIG. 2 is constructed in exactly the same manner and from the same materials as the protector shown in FIG. 1. The thread protector also provides means for sealing both the seal surfaces of the tubular joint using a grease coating and the raised seal rings having a semicircular cross section that is formed integrally with the plastic cup-shaped member.

The plastic cup-shaped member may be molded in the steel cup-shaped member or the two may be formed separately and then assembled. The two members must be securely fastened together so that the steel member can be used to thread the plastic member on the tubular joint. The drain holes must be accurately located to eliminate the possibility of small amounts of water collecting in the tubular joints. A different size of protector may be required for each weight of tubular joint even though the joints may all have the same thread diameter.

What is claimed is:

1. A protector for the threads on a tubular member comprising:

a first cylindrical cup-shaped plastic member, one surface of the cylindrical wall of said first cup-shaped member being formed to conform to the thread surface of the tubular member, said cup-shaped member, in addition, having a plurality of drain holes disposed in the bottom wall thereof, a portion of the outer surface of each of said drain holes being aligned with the inner surface of said tubular member for draining the interior of said tubular member;

a second cylindrical cup-shaped member, said second cup-shaped member being formed of metal and shaped to conform to the other of the cylindrical surfaces of the first cup-shaped member, said second cup-shaped member having a plurality of openings formed in the bottom wall that communicate with the drain holes in said first cup-shaped member; and bosses formed on said cylindrical surface, said bosses being aligned with openings formed in the cylindrical wall of said second cup-shaped member whereby said first cup-shaped member is retained in said second cup-shaped member.

2. The protector of claim 1 wherein said first cup-shaped member is provided with a deformable sealing surface formed on the bottom wall of the first cup-shaped member and disposed to engage the end surface of said tubular member.

3. The protector of claim 1 wherein said first cup-shaped member is provided with threads on said one surface of its cylindrical wall, said threads being formed to conform to the threads on the tubular member.

4. The protector of claim 2 wherein said deformable sealing surface comprises an annular ring that projects above the surface of the bottom wall of the first cup-shaped member.

5. The protector of claim 3 wherein said threads are formed on the inner cylindrical surface of said first cup-shaped member.

6. The protector of claim 3 wherein said threads are formed on the outer cylindrical surface of said first cup-shaped member.

7. The protector of claim 5 wherein the bottom wall of said first cup-shaped member is provided with a raised annular portion, the inside diameter of said raised portion corresponding to the inside diameter of the tubular member, an annular sealing ring being formed on said raised portion and projecting above the surface of said raised portion.

8. The protector of claim 7 wherein the radial surface of said raised portion is formed to conform to the end surface of the tubular member.

9. The protector of claim 7 or 8 wherein the drain holes are formed in said bottom wall adjacent the inner edge of said raised portion.

10. The protector of claim 9 wherein the drain holes in said second cup-shaped member are displaced annularly from the location of the drain holes in the first cup-shaped member, communication between said drain holes being established by radial passages formed in the bottom wall of the first cup-shaped member.

11. The protector of claim 6 wherein the peripheral portion of the bottom wall is formed to conform to the portion of the tubular member adjacent the end of the threads.

12. The protector of claim 11 wherein said first cup-shaped member is provided with an outwardly projecting radial flange on its open end, said radial flange being disposed to engage and seal the end of the pipe.

* * * * *